US011874028B2

(12) United States Patent
Gullapalli (10) Patent No.: US 11,874,028 B2
(45) Date of Patent: Jan. 16, 2024

(54) MODULATING GAS ORIFICE (71) Applicant: Rheem Manufacturing Company, Atlanta, GA (US)

(72) Inventor: Satya Kiran Gullapalli, Camarillo, CA (US)

(73) Assignee: Rheem Manufacturing Company, Atlanta, GA (US)

( * ) Notice: Subject to any disclaimer, the term of this patent is extended or adjusted under 35 U.S.C. 154(b) by 453 days.

(21) Appl. No.: 17/207,908

(22) Filed: Mar. 22, 2021

(65) Prior Publication Data
US 2022/0299238 A1 Sep. 22, 2022

(51) Int. Cl.
*F24H 9/20* (2022.01)
*F24H 9/13* (2022.01)
*F16K 3/03* (2006.01)
*G05D 7/06* (2006.01)

(52) U.S. Cl.
CPC ............ *F24H 9/2035* (2013.01); *F16K 3/03* (2013.01); *F24H 9/136* (2022.01); *G05D 7/0623* (2013.01); *G05D 7/0635* (2013.01)

(58) Field of Classification Search
CPC .......... F24H 9/2035; F24H 9/136; F16K 3/03; G05D 7/0623; G05D 7/0635
See application file for complete search history.

(56) References Cited

U.S. PATENT DOCUMENTS

| 4,023,280 A * | 5/1977 | Schora | F26B 3/0926 432/15 |
| 4,667,477 A * | 5/1987 | Matsuda | F04B 37/08 62/227 |
| 5,120,214 A * | 6/1992 | West | F23N 5/16 431/12 |
| 8,539,786 B2 * | 9/2013 | McSweeney | F25B 49/005 62/204 |
| 2003/0136175 A1 * | 7/2003 | Saikalis | G01N 33/225 73/31.05 |

(Continued)

FOREIGN PATENT DOCUMENTS

JP H11218326 A 8/1999
JP 2016020789 A 2/2016

OTHER PUBLICATIONS

International Search Report for PCT/US2022/021098, dated Jul. 20, 2022 (13 pages).

*Primary Examiner* — Henry T Crenshaw
(74) *Attorney, Agent, or Firm* — Eversheds Sutherland (US) LLP (57) ABSTRACT The disclosed technology includes a gas delivery system for controlling a target gas input rate of a fluid heating device. The system can include a sensor configured to measure a temperature of a gas flowing in a gas flow path, a modulating orifice in fluid communication with the gas flow path, and a motor in mechanical communication with the modulating orifice. The system can further include a controller configured to receive temperature data indicative of the temperature of the gas. The controller can determine a target cross-sectional area of the modulating orifice based at least in part on the target gas input rate and the temperature of the gas and, in response, output a signal to the motor to transition the modulating orifice from a first position to a second position having the target cross-sectional area.

20 Claims, 7 Drawing Sheets

(56) References Cited

U.S. PATENT DOCUMENTS

2006/0162466 A1* 7/2006 Wargo .................. G05D 7/0635
                                                    73/861.63
2012/0060951 A1* 3/2012 Wolter .................. F16K 11/105
                                                    137/595
2013/0321637 A1* 12/2013 Frank .................. H04N 25/677
                                                    348/152

* cited by examiner

MODULATING GAS ORIFICE

FIELD OF THE DISCLOSURE

The present invention relates generally to fuel-fired fluid heating devices, and more particularly, to a modulating orifice for controlling a target gas input rate during operation of a fuel-fired fluid heating device.

BACKGROUND

Traditional fuel-fired fluid heating devices (e.g., a water heater) can include a tank configured to store fluid and a combustion chamber. A gas delivery system can be disposed proximate the combustion chamber and be configured to deliver fuel and air to the burner such that combustion can occur. Combustion of the fuel-and-air mixture within the combustion chamber can provide a source of heat for the fluid within the tank, as the resulting hot combustion gases flow through a flue pipe extending through the tank.

Typically, fuel-fired fluid heating devices are configured to output heated water at a predefined temperature (e.g., a user-defined temperature). Thus, maintaining a steady gas input rate can be critical in order to obtain the predefined temperature of the fluid within the tank and maintain the predefined temperature during a period of time. However, the gas input rate can vary depending on environmental conditions affecting the temperature of the fuel being delivered to the combustion chamber via the gas delivery system. For example, changes in ambient temperature can ultimately cause the temperature of the fuel being directed into the combustion chamber to change (e.g., the temperature of fuel can increase when the ambient temperature is warm and can decrease when the ambient temperature is cool). Without accounting for such change in temperature of the fuel prior to delivering the fuel into the combustion chamber, the gas input rate of the fuel-fired fluid heating device can undesirably change and/or fluctuate, thereby resulting in inefficient operation of the fuel-fired fluid heating device. Continuous and/or periodic operation of the fuel-fired fluid heating device in such inefficient manner can reduce the lifespan of the fuel-fired fluid heating device and potentially require frequent maintenance and/or replacement of components.

SUMMARY

These and other problems can be addressed by the technologies described herein. Examples of the present disclosure relate generally to a gas delivery system for controlling a target gas input rate of a fluid heating device based at least in part of the temperature of the gas being delivered to a combustion chamber of the fluid heating device.

The disclosed technology can include a gas delivery system for controlling a target gas input rate of a fluid heating device. The gas delivery system can include a sensor in fluid communication with a gas flowing in a gas flow path and configured to measure a temperature of the gas, a modulating orifice in fluid communication with the gas flow path, a motor in mechanical communication with the modulating orifice, and a controller in communication with the sensor and the motor. The controller can be configured to receive, from the sensor, temperature data indicative of the temperature of the gas, determine a target cross-sectional area of the modulating orifice based at least in part on the target gas input rate and the temperature data, and output a signal to the motor to transition the modulating orifice from a first position having a first cross-sectional area to a second position having the target cross-sectional area.

The controller can be further configured to calculate the target gas input rate based at least in part of data indicative of (i) a predetermined temperature of water in a tank of the fluid heat device, (ii) a size of the tank of the fluid heating device, or (iii) a type of the gas flowing in the gas flow path.

The modulating orifice can be defined, at least in part, by a plurality of leaves, and the motor can be configured to alter the configuration of the plurality of leaves to transition the modulating orifice from the first position to the second position.

The controller can be further configured to receive data indicative of a type of the gas flowing through the gas flow path and determine the target cross-sectional area of the modulating orifice based at least in part on the type of gas.

The gas delivery system can further include a housing including an inlet configured to receive the gas flowing in the gas flow path and an outlet, the housing enclosing the sensor and the modulating orifice.

The controller can be further configured to determine the temperature of the gas is less than a threshold temperature and determine the target cross-sectional area of the modulating orifice is less than the first cross-sectional area.

The controller can be further configured to determine the temperature of the gas is greater than a temperature threshold and determine the target cross-sectional area of the modulating orifice is greater than the first cross-sectional area.

The controller can be further configured to determine the temperature of the gas is less than a threshold temperature by a predetermined percentage and determine the target cross-sectional area of the modulating orifice is less than the first cross-sectional area by a predetermined percentage.

The controller can be further configured to determine the temperature of the gas is greater than a threshold temperature by a predetermined percentage and determine the target cross-sectional area of the modulating orifice is greater than the first cross-sectional area by a predetermined percentage.

The sensor can measure the temperature data over a predetermined period of time and transmits the temperature data a predetermined number of times during the predetermined period of time.

The controller can be further configured to receive data indicative of the first cross-sectional area of the modulating orifice and determine the target cross-sectional area of the modulating orifice based at least in part on (i) the first cross-sectional area of the modulating orifice, (ii) a maximum cross-sectional area of the modulating orifice, and (iii) a minimum cross-sectional area of the modulating orifice.

The motor can be a stepper motor configured to incrementally increase or decrease the first cross-sectional area of the modulating orifice to transition to the target cross-sectional area.

The disclosed technology can further include a gas delivery system for controlling a target gas input rate of a fluid heating device comprising a sensor in communication with a gas flowing in a gas flow path and configured to measure a temperature of the gas, an electronic valve in fluid communication with the gas flow path, and a controller in communication with the sensor and the electronic valve. The controller can be configured to receive, from the sensor, temperature data indicative of the temperature of the gas, determine a target cross-sectional area of an orifice of the electronic valve based at least in part on the target gas input rate and the temperature data, and output a signal to the electronic valve to transition the orifice from a first position having a first cross-sectional area to a second position having the target cross-sectional area.

The controller can be further configured to receive data indicative of a type of the gas flowing through the gas flow path and determine the target cross-sectional area of the orifice of the electronic valve based at least in part on the type of the gas.

The gas delivery system can further include a housing including an inlet configured to receive the gas flowing in the gas flow path and an outlet, the housing enclosing the sensor and the electronic valve.

The controller can be further configured to determine the temperature of the gas is less than a threshold temperature and determine the target cross-sectional area of the orifice of the electronic valve is less than the first cross-sectional area.

The controller can be further configured to determine the temperature of the gas is greater than a temperature threshold and determine the target cross-sectional area of the orifice of the electronic valve is greater than the first cross-sectional area.

The disclosed technology can further include a non-transitory, computer readable medium storing instructions, that when executed by one or more processors, can cause a controller of a gas delivery system to receive, from a sensor, temperature data indicative of a temperature of a gas, determine a target cross-sectional area of a modulating orifice based at least in part on a target gas input rate and the temperature data, and output a signal to a motor to transition the modulating orifice from a first position having a first cross-sectional area to a second position having the target cross-sectional area.

The instructions, when executed by the one or more processors, can further cause the controller to determine the temperature of the gas is less than a temperature threshold and determine the target cross-sectional area of the modulating orifice is less than the first cross-sectional area.

The instructions, when executed by the one or more processors, can further cause the controller to determine the temperature of the gas is greater than a temperature threshold and determine the target cross-sectional area of the modulating orifice is greater than the first cross-sectional area.

These and other aspects of the present disclosure are described in the Detailed Description below and the accompanying figures. Other aspects and features of the present disclosure will become apparent to those of ordinary skill in the art upon reviewing the following description of specific examples of the present disclosure in concert with the figures. While features of the present disclosure may be discussed relative to certain examples and figures, all examples of the present disclosure can include one or more of the features discussed herein. Further, while one or more examples may be discussed as having certain advantageous features, one or more of such features may also be used with the various other examples of the disclosure discussed herein. In similar fashion, while examples may be discussed below as devices, systems, or methods, it is to be understood that such examples can be implemented in various devices, systems, and methods of the present disclosure.

BRIEF DESCRIPTION OF THE FIGURES

Reference will now be made to the accompanying figures, which are not necessarily drawn to scale, and wherein.

DETAILED DESCRIPTION

The disclosed technology includes a gas delivery system configured to deliver a fuel or gas to a combustion chamber of a fluid heating device. The gas delivery system can include a modulating orifice and a sensor configured to measure the temperature of the gas being delivered to the combustion chamber. Based at least in part on the measured temperature of the gas, the controller can determine a target cross-sectional area of the modulating orifice that is required to maintain a target gas input rate of the fluid heating device, and accordingly output a signal to the modulating orifice to transition from a first position having a first cross-sectional area to a second position having the target cross-sectional area.

By varying the cross-sectional area of the modulating orifice to account for fluctuations in the ambient temperature that can affect the temperature of gas being delivered to the combustion chamber, the target gas input rate of the fluid heating device can be maintained. A steady gas input rate of a fluid heating device can provide heated water at a desired predetermined temperature in an efficient manner and reduce the need for maintenance and repair of components that can occur due to fluctuations in the temperature of gas.

The disclosed technology will be described more fully hereinafter with reference to the accompanying drawings. This disclosed technology can, however, be embodied in many different forms and should not be construed as limited to the examples set forth herein. The components described hereinafter as making up various elements of the disclosed technology are intended to be illustrative and not restrictive. Such other components not described herein may include, but are not limited to, for example, components developed after development of the disclosed technology.

In the following description, numerous specific details are set forth. But it is to be understood that examples of the disclosed technology can be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," "one example,' "an example," "some examples," "certain examples," "various examples," etc., indicate that the embodiment(s) and/or example(s) of the disclosed technology so described may include a particular feature, structure, or characteristic, but not every embodiment necessarily includes the particular feature, structure, or characteristic. Further, repeated use of the phrase "in one embodiment" or the like does not necessarily refer to the same embodiment, example, or implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

Unless otherwise specified, all ranges disclosed herein are inclusive of stated end points, as well as all intermediate values. By way of example, a range described as being "from approximately 2 to approximately 4" includes the values 2 and 4 and all intermediate values within the range. Likewise, the expression that a property "can be in a range from approximately 2 to approximately 4" (or "can be in a range from 2 to 4") means that the property can be approximately 2, can be approximately 4, or can be any value therebetween. Further, the expression that a property "can be between approximately 2 and approximately 4" is also inclusive of the endpoints, meaning that the property can be approximately 2, can be approximately 4, or can be any value therebetween.

Unless otherwise specified, the terms fluid, liquid, and/or water disclosed herein are inclusive of pure water ($H_2O$) and pure water plus any additives or additional component. Further, while the disclosed technology is referenced as be useful for water applications, it is to be understood that the disclosed technology can be used for any fluid, liquid, or otherwise.

Figure 1A:
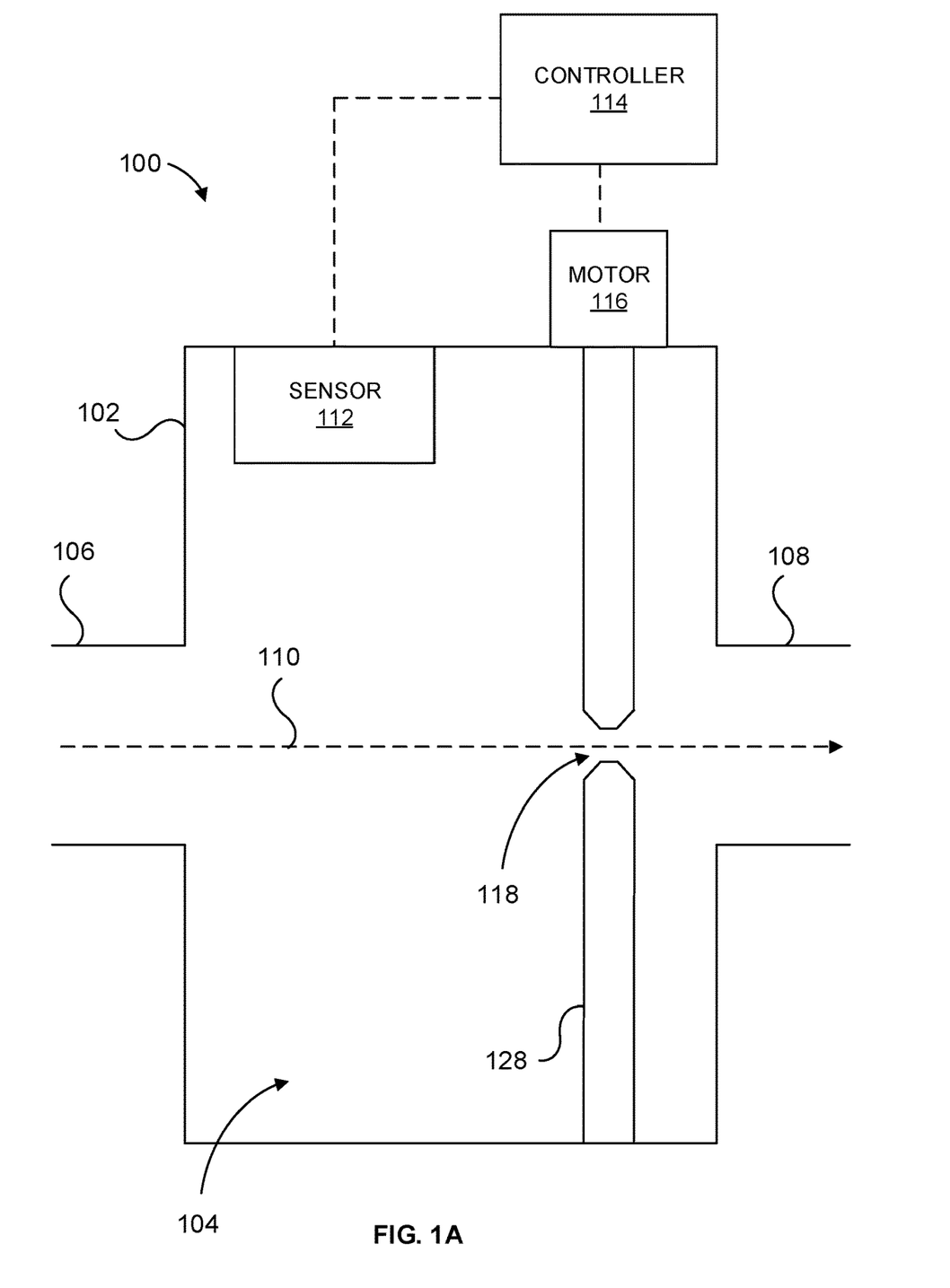
FIG. 1A illustrates a cross-sectional schematic view of an example gas delivery system having a modulating orifice, in accordance with the disclosed technology.
Figure 1B:
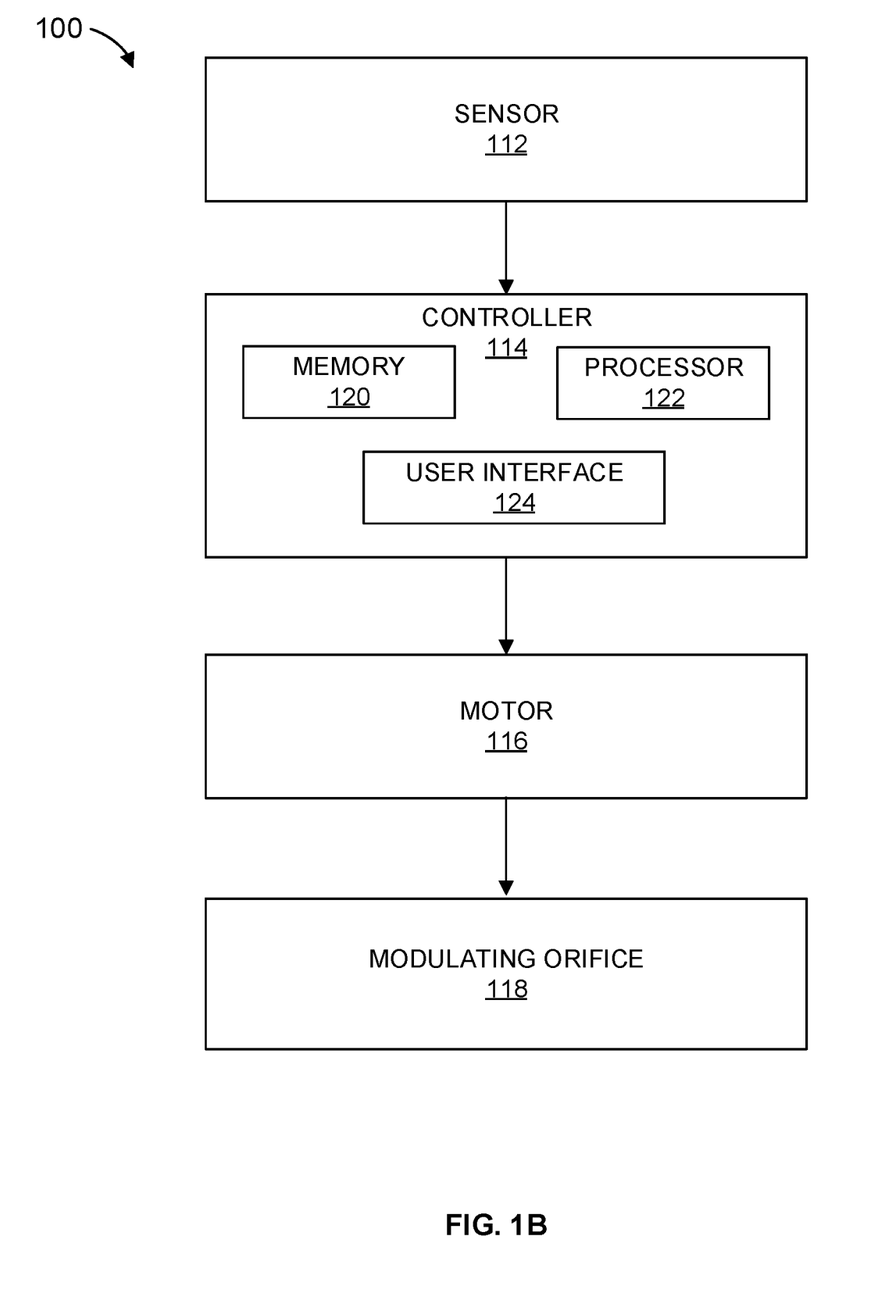
FIG. 1B is a schematic diagram of the example gas delivery system of FIG. 1A, in accordance with the disclosed technology.

Referring now to the figures, FIGS. 1A and 1B illustrate an example gas delivery system 100. FIG. 1A illustrates an example configuration of the gas delivery system 100 while FIG. 1B illustrates a schematic diagram of the gas delivery system 100. The gas delivery system 100 can include a housing 102 having a cavity 104. The housing 102 can include an inlet 106 for receiving a gas and an outlet 108 for outputting the gas. The gas flowing through the cavity 104 can flow in a gas flow path 110 from the inlet 106 to the outlet 108. Optionally, the inlet 106 and the outlet 108 can be substantially aligned with each other such that the gas can flow in a linear gas flow path 110 through the cavity 104 of the housing 102. Optionally, a valve can be disposed proximate the inlet 106. The valve can deliver the gas into the cavity 104 of the housing 102 via the inlet 106. Optionally, the valve can be an electronic valve. Upon receiving a signal that the temperature of water in a tank of a fluid heating device is below a threshold temperature, the electronic valve can at least partially open in order to direct gas through the cavity 104 and ultimately to the combustion chamber of the fluid heating device via the outlet 108.

The gas delivery system 100 can further include a sensor 112 and a modulating orifice 118 disposed within the cavity 104 of the housing 102. The sensor 112 can be disposed at any location in the cavity 104 upstream from the modulating orifice 118. Optionally, the sensor 112 can be disposed at a location within the cavity 104 that does not impede gas flowing from the inlet 106 to the outlet 108 via the gas flow path 110. For example, and as illustrated in FIG. 1A, the sensor 112 can be disposed proximate a wall of the housing 102. The sensor 112 can be configured to measure and/or detect a temperature of the gas within the cavity 104. For example, the sensor 112 can be configured to measure the temperature of the gas flowing from the inlet 106 to the outlet 108 via the gas flow path 110 prior to the gas flowing through the modulating orifice 118. Alternatively, the sensor 112 can be disposed at any location in the cavity 104 downstream from the modulating orifice 118. If the sensor 112 is located downstream from the modulating orifice 118, the sensor 112 can thus be configured to measure temperature of the gas after it has flowed through the modulating orifice 118. In such a configuration, the gas delivery system 100 can be configured to compensate for any impact the combusting fuel-and-air mixture in the combustion chamber may have on the gas temperature detected by the sensor 112.

Optionally, the gas delivery system 100 can omit the housing 102. In such instance, the sensor 112 and the modulating orifice 118 can be attached to and/or extend into a gas delivery supply tube and/or conduit.

The sensor 112 can be in electrical communication with a controller 114 such that upon the sensor 112 detecting the temperature of the gas, the sensor 112 can continuously and/or periodically transmit signals indicative of the temperature of the gas to the controller 114 as temperature data. As illustrated in FIG. 1B, the controller 114 can include a memory 120, a processor 122, and a user interface 124. The controller 114 can be configured to send and receive wireless or wired signals, and the signals can be analog or digital signals. The wireless signals can include Bluetooth™, BLE, WiFi™, ZigBee™, infrared, microwave radio, or any other type of wireless communication as may be appropriate for the particular application. The hard-wired signal can include any directly wired connection between the controller 114 and the other components. For example, the controller 114 can have a hard-wired 24 VDC connection to various components. Alternatively, the components can be powered directly from a power source and receive control instructions from the controller 114 via a digital connection. The digital connection can include a connection such as an Ethernet or a serial connection and can utilize any appropriate communication protocol for the application such as Modbus, fieldbus, PROFIBUS, SafetyBus p, Ethernet/IP, or any other appropriate communication protocol for the application. Furthermore, the controller 114 can utilize a combination of wireless, hard-wired, and analog or digital communication signals to communicate with and control the various components. One of skill in the art will appreciate that the above configurations are given merely as non-limiting examples and the actual configuration can vary depending on the application.

Optionally, the controller 114 can be disposed on, near, or proximate the housing 102. Optionally, the controller 114 can be disposed external to the housing 102 and/or the fluid heating device (e.g., remote from the fluid heating device). Optionally, the controller 114 can be coupled to the fluid heating device.

The memory 120 can be a non-transitory computer readable medium that stores instructions that, when executed by the processor 122, cause the controller 114 to perform certain actions, such as those described herein. The memory 120 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques described herein can be implemented as a combination of executable instructions and data within the memory 120.

The user interface 124 can include selectable textual or graphical inputs (e.g., graphical buttons and/or icons capable of being pressed, tapped, or clicked). A user can use such selectable inputs to indicate the type of gas being delivered into the fluid heating device via the gas delivery system 100. A user can further use the selectable inputs to indicate a target gas input rate of the fluid heating device. The target gas input rate is commonly defined as the amount of gas consumed by the fluid heating device in one hour. The target input gas rate can depend on the size of the tank of the fluid heating device. For example, a 30-gallon fluid heating device can have a target gas input rate of 32,000 BTU, meaning that the 30-gallon fluid heating device can heat 32,000 pounds of water by one degree in one hour. Typically, a higher gas input rate can indicate efficient operation and faster recovery time, thereby fostering a longer lifespan of the fluid heating device. A user can further use the selectable inputs to indicate the desired preset temperature of the heated water within the tank and/or an hourly, daily, weekly, or other time schedule of when the tank of the fluid heating device should maintain heated water at such preset temperature.

The modulating orifice 118 can be disposed in the cavity 104 downstream in relation to the sensor 112 and upstream of the outlet 108 and can comprise a plurality of plates or leaves 128. Gas flowing through the cavity 104 via the gas flow path 110 can flow through the modulating orifice 118 and exit the outlet 108 such that the gas can enter the combustion chamber of the fluid heating device. The modulating orifice 118 can be configured to at least partially open and/or close (e.g., increase in cross-sectional area and/or decrease in cross-sectional area). The leaves 128 of the modulating orifice 118 can be in mechanical communication with a motor 116 configured to at least partially open and/or close the modulating orifice 118. Each leaf 128 can abut or overlap an adjacent leaf 128 such that, as the anchored portion of the leaves 128 are rotated and/or moved radially outward, the extending portion of each leaf shifts radially outward to increase the area of the opening of the modulating orifice 118. As discussed herein with reference to FIGS. 2A-2D, the motor 116 can cause the one or more leaves 128 to move via an iris mechanism to at least partially open (e.g., increase the cross-sectional area) or close (e.g., decrease the cross-sectional area) the modulating orifice 118.

The motor 116 can be any device capable of opening, closing, and/or modulating the modulating orifice 118 either gradually or incrementally. For example, the motor 116 can be configured to gradually open and/or close the modulating orifice 118, thereby increasing and/or decreasing the cross-sectional area of the modulating orifice 118. In such configuration, the modulating orifice 118 can provide a spectrum of potential cross-sectional areas. For example, the modulating orifice 118 can have any number of potential cross-sectional areas ranging from entirely and/or substantially closed to entirely and/or substantially open. Alternatively or in addition, the motor can be a stepper motor that can transition the modulating orifice 118 from a first position to a second position in predetermined increments (e.g., predetermined increases and/or decreases in the cross-sectional area of the modulating orifice 118). If the motor 116 is a stepper motor, a rotor within the motor 116 can rotate a predetermined amount in a first direction or a second direction. Rotation of rotor in the first direction can cause the modulating orifice 118 to at least partially open (e.g., increase in cross-sectional area), while rotation of the rotor in the second direction can cause the modulating orifice 118 to at least partially close (e.g., decease in cross-sectional area). The predetermined amount of rotation can correspond to a predetermined amount in which the modulating orifice 118 opens or closes. The predetermined amount in which the modulating orifice 118 opens or closes can be a predetermined increase or decrease in the cross-sectional area of the modulating orifice 118. Optionally, the motor 116 and the modulating orifice 118 can be separate components. Alternatively, the motor 116 and the modulating orifice 118 can be integral and/or combined to form to single packaged component.

Figure 2A:
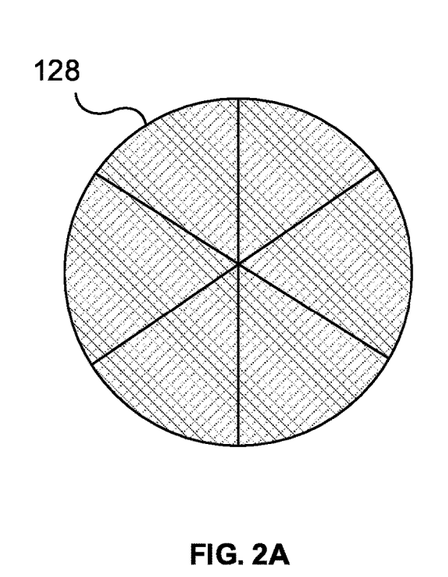
FIGS. 2A-2D illustrate example positions of a modulating orifice of the gas delivery system of FIGS. 1A-1B, in accordance with the disclosed technology.
Figure 2B:
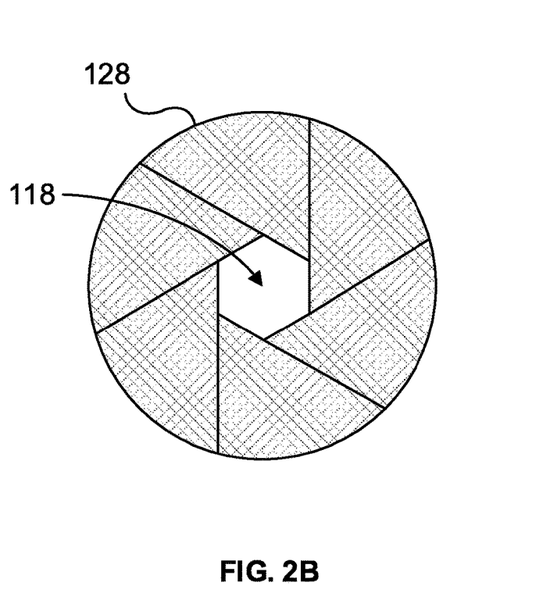
Figure 2C:
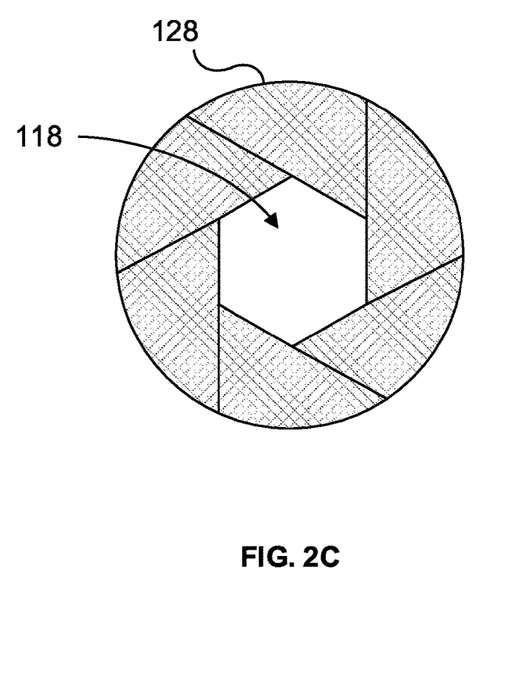
Figure 2D:
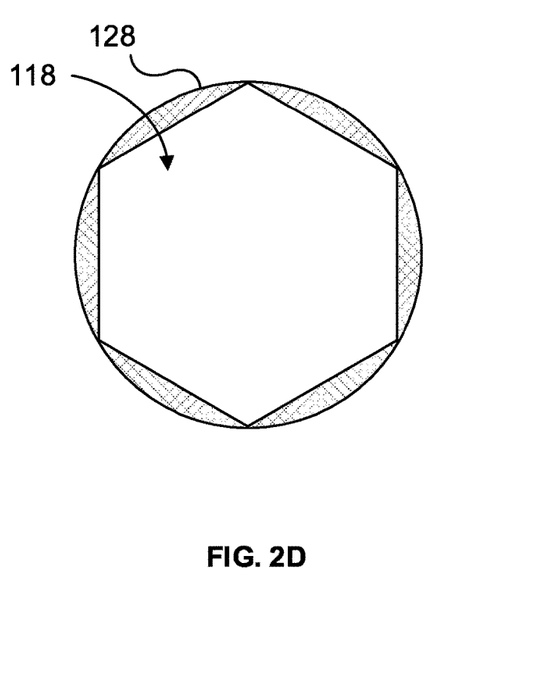

FIGS. 2A-2D illustrate an example modulating orifice 118. The modulating orifice 118 can have any cross-sectional shape. For example, the modulating orifice 118 can have a circular, ovular, rectangular, or polygonal cross-sectional area. As illustrated in FIGS. 2A-2D, the modulating orifice 118 can have a substantially hexagonal cross-sectional area. A plurality of irregular shaped leaves 128 can define the modulating orifice 118. The modulating orifice 118 can at least partially open (e.g., increase cross-sectional area of the central opening) and close (e.g., decrease the cross-sectional area of the central opening) via an iris mechanism. FIG. 2A illustrates the modulating orifice 118 is a substantially closed position. The modulating orifice 118 can be substantially closed when gas is not being delivered to the combustion chamber of the fluid heating device (e.g., when the temperature of water within the tank of the fluid heating device is equal to or greater than the predetermined temperature). FIGS. 2B and 2C illustrate the modulating orifice 118 in partially open positions. As the modulating orifice 118 opens, the cross-sectional area of the modulating orifice 118 can increase. FIG. 2D illustrates the modulating orifice 118 in a substantially open position, such that the cross-sectional area of the modulating orifice 118 is greater as compared to when the modulating orifice 118 is in a partially open position. Each position of the modulating orifice 118 as illustrated in FIGS. 2A-2D can result in a different gas delivery flow rate and/or amount, and thus, by tailoring the size of the cross-sectional area of the modulating orifice 118 (e.g., in response to the measured temperature of gas within the cavity 104 of the housing 102, as further discussed herein), the target gas input rate of the fluid heating device can be maintained despite changes to the temperature of the gas within the cavity 104 of the housing 102 due to ambient conditions. Such iris mechanism can facilitate aligning the flow of gas with approximately a center axis of the modulating orifice 118.

Figure 3:
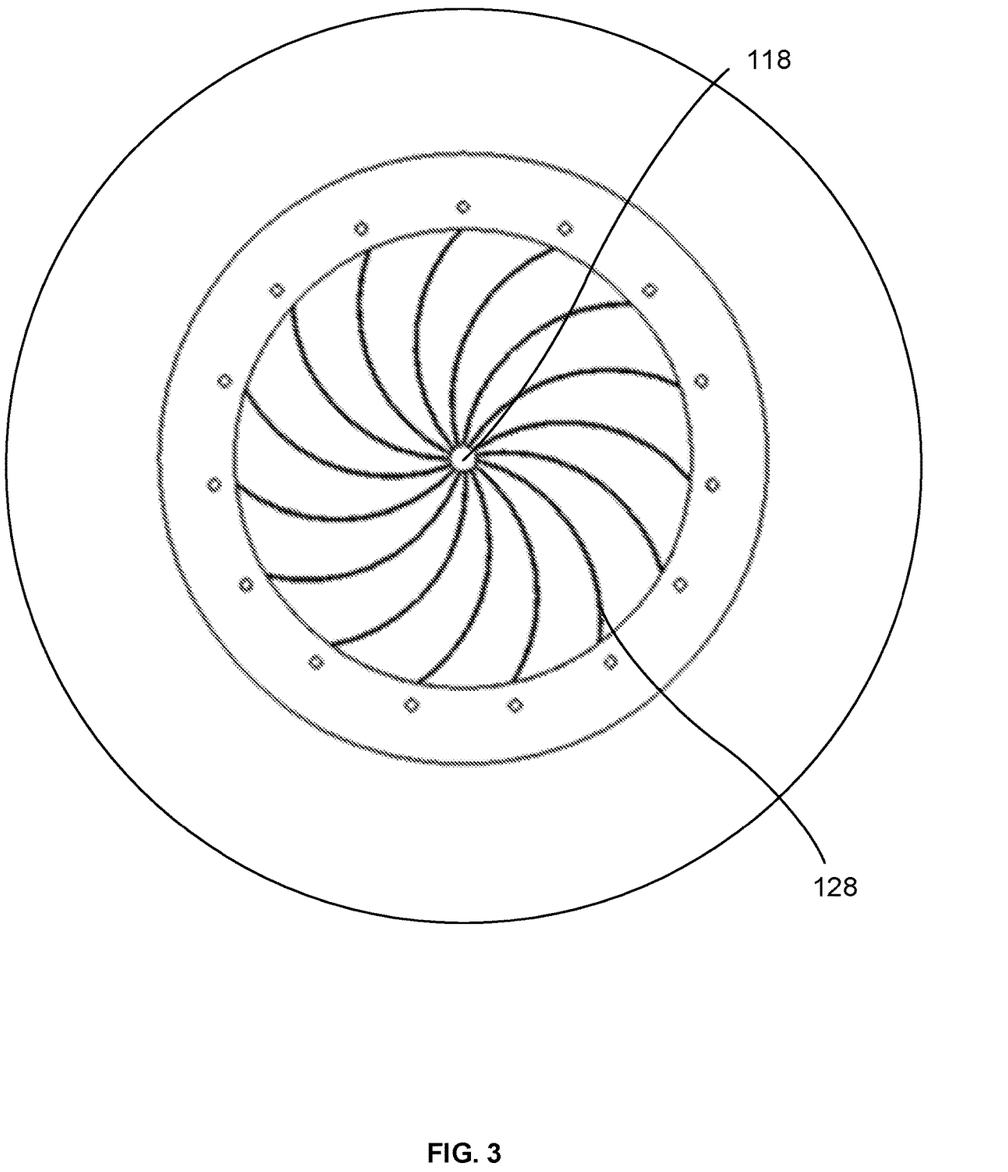
FIG. 3 illustrates a cross-sectional view of an example modulating orifice, in accordance with the disclosed technology.

As illustrated in FIG. 3, the modulating orifice 118 can have a substantially circular cross-sectional area. As in the example modulating orifice 118 illustrated in FIGS. 2A-2D, the modulating orifice 118 illustrated in FIG. 3 can at least partially open (e.g., increase cross-sectional area of the central opening) and close (e.g., decrease the cross-sectional area of the central opening) via an iris mechanism. The cross-sectional area of the modulating orifice 118 can vary based on the shape, number, and configuration of the leaves 128. Optionally, all or a portion of the leaves 128 can be substantially curved, as illustrated in FIG. 3. Alternatively or in addition, all or a portion of the leaves 128 can be irregularly shaped. Optionally, additional leaves 128 can be added and/or the amount of overlap of adjacent leaves 128 can be increased and/or decreased in order to adjust the shape of the modulating orifice 118. Although FIGS. 2A-3 illustrate the modulating orifice 118 being configured to at least partially open and close via an iris mechanism, it is contemplated that any mechanism configured to control the cross-sectional area of the modulating orifice 118 can be used.

Figure 4:
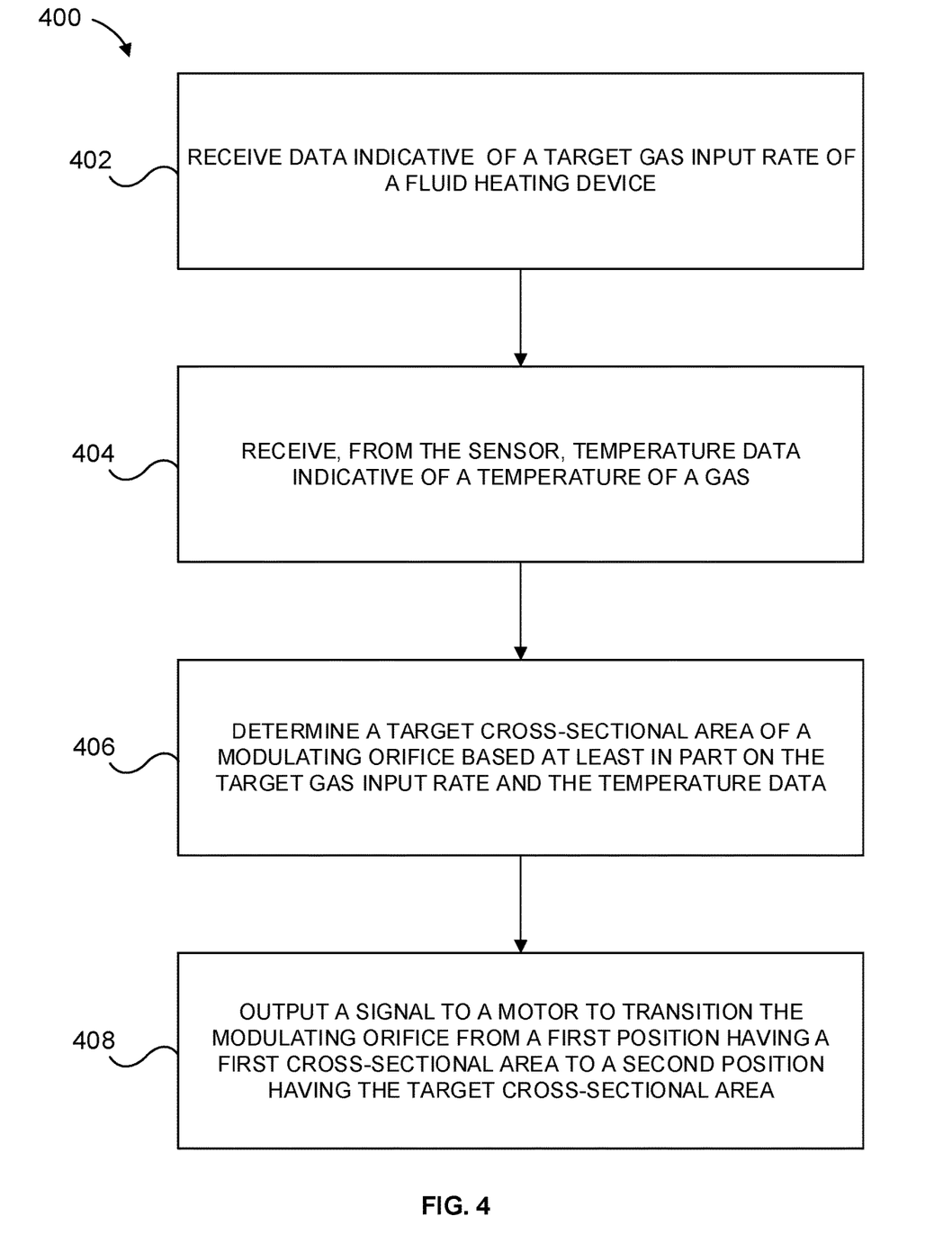
FIG. 4 is a flow diagram outlining a method of controlling a target gas input rate via the gas delivery system of FIGS. 1A and 1B, in accordance with the disclosed technology.

FIG. 4 is a flow diagram outlining a method 400 of controlling a target gas input rate of a fluid heating device. It can be critical for the gas input rate (e.g., BTU input rate) of a fluid heating device to remain substantially constant during operation of the fluid heating device. A constant gas input rate can ensure that the water within the tank of the fluid heating device appropriately heats to the predetermined temperature and maintains the predetermined temperature for a predetermined period of time. However, changes in the temperature of gas being delivered into the combustion chamber of the fluid heating device can undesirably affect the target gas input rate. In order to account for such fluctuations in the temperature of gas being delivered into the combustion chamber due at least in part to ambient conditions, the cross-sectional area and/or diameter of the modulating orifice 118 can be appropriately increased or decreased to control the target gas input rate.

The method 400 can include receiving 402 data indicative of a target gas input rate of the fluid heating device. For example, a user can use the user interface 124 of the controller 114 to select and/or manually enter using one or more selectable graphical inputs the target gas input rate (e.g., BTU input rate) of the fluid heating device. Alternatively or in addition, a manufacturer of the fluid heating device can pre-program the target gas input rate of the fluid heating device into the controller 114. Optionally, the manufacturer can provide materials associated with the fluid heating device that indicate the target gas input rate, and subsequently the user can use the user interface 124 to enter the target gas input rate. The target gas input rate of the fluid heating device can be based at least in part on the application in which the fluid heating device is being used, the size of the water storage tank of the fluid heating device, and/or the type of gas being delivered into the fuel-fired heating device. For example, the target gas input rate of a 30-gallon tank fluid heating device can be approximately 32,000 BTU. Optionally, the user can further select and/or manually enter using one or more selectable graphical inputs the type of gas that is being delivered into the combustion chamber of the fluid heating device.

Alternatively, the controller 114 can receive data indicative of a predetermined target temperature of fluid within a tank of the fluid heating device. Optionally, the controller 114 can further receive data indicative of a current temperature of fluid within the tank of the fluid heating device. The controller 114 can calculate the target gas input rate based at least in part on the predetermined target temperature of fluid within the tank of the fluid heating device and/or the current temperature of fluid within the tank of the fluid heating device. Optionally, the controller 114 can calculate the target gas input rate based at least in part on the size of the tank of the fluid heating device. Optionally, the controller 114 can calculate the target heat input based at least in part on the type of gas that is being delivered into the combustion chamber of the fluid heating device.

The method 400 can include receiving 404 temperature data from the sensor 112 indicative of the temperature of gas within the cavity 104 and flowing from the inlet 106 to the outlet 108 via the gas flow path 110. The sensor 112 can be configured to measure the temperature of gas within the cavity 104 upstream of the modulating orifice 118. The sensor 112 can be configured to transmit the measured temperature of gas as temperature data. Optionally, the sensor 112 can measure a single temperature of the gas within the cavity 104 and transmit to the controller 114 the single temperature as temperature data. Optionally, the sensor 112 can be configured to measure temperatures of the gas continuously during a predetermined period of time and transmit the measured temperature data continuously during the predetermined period of time. For example, the sensor 112 can measure temperatures of the gas continuously during a ten minute period of time, during a twenty minute period of time, or during any other period of time defined by when gas is being delivered to the combustion chamber and continuously transmit to the controller 114 such measured temperatures as temperature data. Alternatively or in addition, the sensor 112 can be configured to measure temperatures of the gas within the cavity 104 periodically, such as at predetermined intervals (e.g., once every second, once every 10 seconds, once every minute, or any other predetermined interval) over a predetermined period of time (e.g., ten minutes, twenty minutes, one hour, or any other predetermined period of time) and similarly transmit the measured temperatures as temperature data to the controller 114 periodically, such as at predetermined intervals (e.g., once every 10 seconds, once every minute, once every 2 minutes, or any other predetermined interval). As an example, the sensor 112 can measure the temperature of the gas within the cavity 104 every ten seconds and can transmit to the controller 114 the measured temperatures as temperature data every minute. While continuous transmission of temperature data may enable a more accurate and timely modulation of the modulating orifice 118, periodic transmission can provide benefits such as reduced battery usage and the like.

Although specific examples of measuring temperature data and transmitting the measured temperature are discussed above, any frequency of temperature recording (i.e., how often temperature data is recorded) by the sensor 112 is herein contemplated. Similarly, any frequency of transmission of measured, recorded temperature data (i.e., how often temperature data is transmitted) by the sensor 112 is also herein contemplated. Frequency of recordings and transmission can be adjusted depending on the level of specificity desired.

The method 400 can further include determining 406 (e.g., by the controller 114) a target cross-sectional area of the modulating orifice 118 based at least in part on the temperature data indicative of the temperature of gas and the target gas input rate. Optionally, the controller can determine the target cross-sectional area of the modulating orifice 118 based additionally on the type of gas being delivered into the combustion chamber.

Determining the target cross-sectional area of the modulating orifice can include comparing the temperature of the gas being delivered to the combustion chamber to a stored threshold temperature. Optionally, the stored threshold temperature can be based on the type of the gas (e.g., natural gas, propane, and the like). If the temperature of the gas being delivered to the combustion chamber is greater than the stored threshold temperature, the controller 114 can determine that an increase in the amount of gas is required to maintain the target gas input rate. Accordingly, an increase in the cross-sectional area of the modulating orifice 118 as compared to the initial cross-sectional area of the modulating orifice can be required to maintain the target gas input rate. By way of example, if the temperature of the gas is greater than the stored threshold temperature by a predetermined percentage, the controller can determine that the target cross-sectional area is a predetermined percentage larger than the initial cross-sectional area of the modulating orifice. Alternatively, if the temperature of gas being delivered to the combustion chamber is less than the stored threshold temperature, the controller 114 can determine a decrease in the amount of gas can be required to maintain the target gas input rate. Accordingly, a decrease in the cross-sectional area of the modulating 118 as compared to the initial cross-sectional area of the modulating orifice 118 can be required to maintain the target gas input rate. By way of example, if the temperature of the gas is less than the stored threshold temperature by a predetermined percentage, the controller can determine that the target cross-sectional area is a predetermined percentage smaller than the initial cross-sectional area of the modulating orifice.

Optionally, the controller 114 can determine the target cross-sectional area using one or more processing and/or algorithmic techniques. Such processing and/or algorithmic techniques can determine the target cross-sectional area based on the temperature of gas being delivered into the combustion chamber, the target heat input, and the type of gas. Optionally, determining the target cross-sectional area can be based at least in part on additional inputs, including the initial cross-sectional area of the modulating orifice 118, the maximum cross-sectional area of the modulating orifice 118, and the minimum cross-sectional area of the modulating orifice 118.

The method 400 can include outputting 408 a signal to the motor 116 to transition the modulating orifice 118 from a first position to a second position. The first position can have a first cross-sectional area and the second position can have the target cross-sectional area. Optionally, the first position can be the initial cross-sectional area of the modulating orifice 118.

As discussed herein, when the motor 116 is a stepper motor, the motor can incrementally increase and/or decrease the cross-sectional area of the modulating orifice 118 until the target cross-sectional area is reached (e.g., by incremental rotations). Each predetermined rotation of the rotor can correspond to a percent increase or decrease in cross-sectional area of the modulating orifice 118. By way of example, each predetermined rotation of the rotor of the step motor can correspond to a 1%, 5%, 10%, 25%, 50%, or any other percent increase in the cross-sectional area.

As discussed herein, when the motor 116 is configured to gradually increase and/or decrease the cross-sectional area of the modulating orifice 118, the controller 114 can output a signal to the motor 116 indicative of the target cross-sectional area and the motor 116 can effectuate such movement until the target cross-sectional area is obtained.

Optionally, the controller 114 can continue to receive temperature data from the sensor 112 over predetermined time. Accordingly, if the controller 114 determines a change in the target cross-sectional area is required to maintain the target gas input rate, the controller 114 can output a signal to the modulating orifice 118 to transition from the second position to the third position, where the third position can have a "new" target cross-sectional area. The "new" target cross-sectional area can be greater than or less than the original target cross-sectional area of the second position.

Although determining a target cross-sectional area to maintain the target gas input rate is discussed herein, it is contemplated a target diameter can similarly be determined to maintain the target gas input rate, and the method 400 can further include outputting a signal to the modulating orifice to transition from a first position having a first diameter to a second position having the target diameter.

By varying the cross-sectional area and/or diameter of the modulating orifice 118 based at least in part on the temperature of the gas being delivered to the combustion chamber and the target gas input rate of the fluid heating device, the amount of gas being delivered to the combustion chamber can be varied and, accordingly, the target gas input rate can be maintained. Thereby, the fluid heating device can provide heated water at the desired predetermined temperature in an efficient manner and the lifespan of the fluid heating device can be improved as to fluid heating devices that are unable to account for fluctuations in the temperature of the gas being delivered to the combustion chamber that can undesirably alter the input rate of the fluid heating device.

Figure 5:
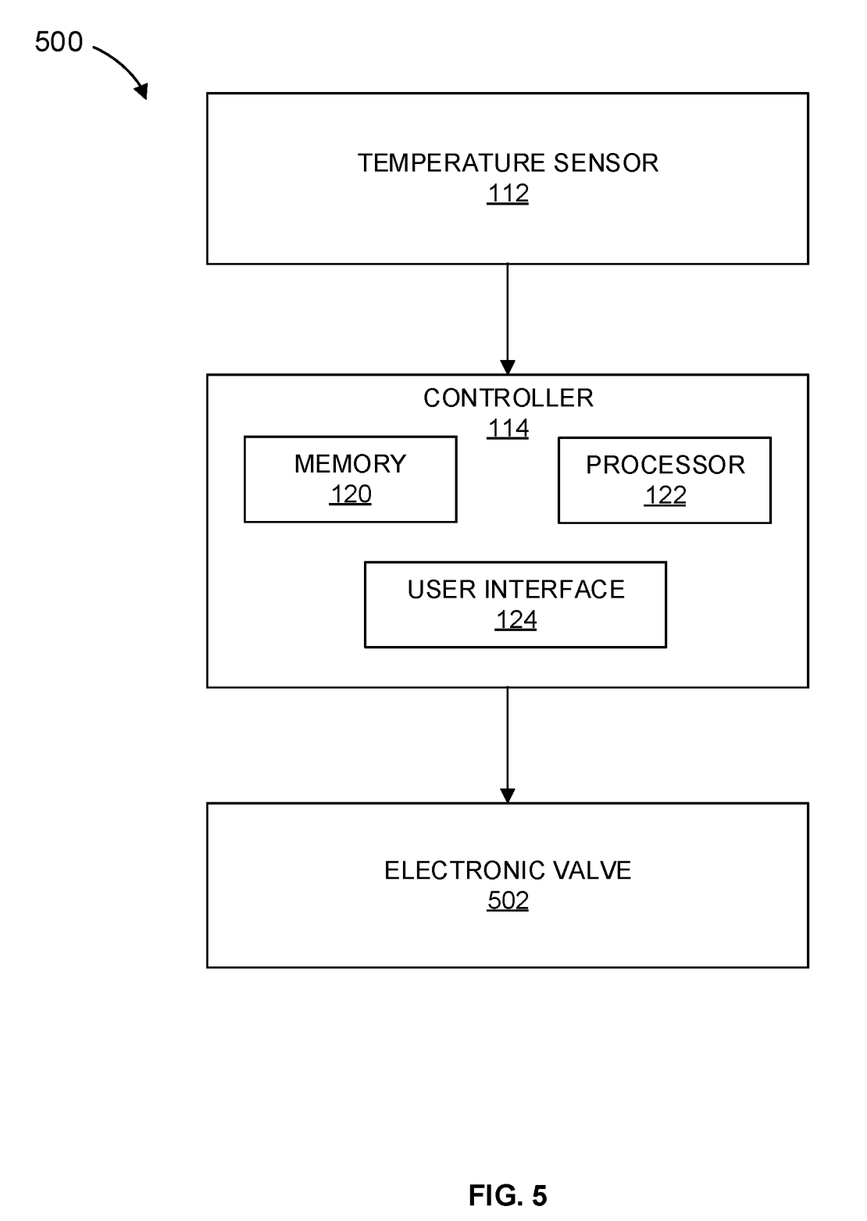
FIG. 5 is an additional example gas delivery system having an electronic valve, in accordance with the disclosed technology.

FIG. 5 illustrates an additional example gas delivery system 500. The gas delivery system 500 can be substantially similar to the gas delivery system 100 illustrated in FIGS. 1A and 1B, however, the gas delivery system 500 can include an electronic valve 502 in place of the motor 116 and modulating orifice 118. Accordingly, the characteristics and features disclosed with respect to FIGS. 1A and 1B including the configuration of the housing 102 having the inlet 106 and the outlet 108, the sensor 112, and the controller 114, including the memory 120, the processor 122, and the user interface 124, can be similarly applicable to the gas delivery system 400.

The electronic valve 502 can be disposed within the cavity 104 of the housing 102 downstream in relation to the sensor 112. The electronic valve 502 can be positioned within the cavity 104 to receive gas flowing from the inlet 106 to the outlet 108 via the gas flow path 110. Optionally, the electronic valve 502 can be disposed proximate the outlet 108 of the housing 102. Alternatively, the sensor 112 can be disposed at any location in the cavity 104 downstream from the electronic valve 502. If the sensor 112 is located downstream from the electronic valve 502, the sensor 112 can thus be configured to detect temperature of the gas after it has flowed through the electronic valve 502. In such a configuration, the gas delivery system 100 can be configured to compensate for any impact the combusting fuel-and-air mixture in the combustion chamber may have on the gas temperature detected by the sensor 112.

The controller 114 can be in electrical communication with the sensor 112 and the electronic valve 502. The controller 114 can receive temperature data from the sensor 112 indicative of the temperature of gas within the cavity 104 of the housing 102 and upstream of the electronic valve 502. The controller 114 can further output signals to the electronic valve 502 to at least partially open and/or close based at least in part on the temperature data and the target gas input rate of the fluid heating device.

The electronic valve 502 can be configured to control the amount of gas that flows from the cavity 104 of the housing 102 to the combustion chamber of the fluid heating device. The electronic valve 502 can receive one or more signals from the controller 114 to at least partially open and/or close an orifice of the electronic valve 502 a predetermined amount such that the cross-sectional area of the orifice increases or decreases as compared to an initial cross-sectional area of the orifice. The electronic valve 502 can include an actuator (e.g., a stem configured to move upwards and downwards and/or a stem configured to rotate). The actuator can be configured to mechanically open or close the orifice of the electronic valve 502 a predetermined amount in response to receiving a corresponding signal. For example, the actuator of the electronic valve 502 can receive a signal from the controller 114 that instructs how far to raise or lower a stem such that the orifice of the electronic valve 502 respectively increases or decreases in cross-sectional area. Alternatively, the electronic valve 502 can receive a signal from the controller 114 that instructs how far and in what direction to rotate a stem such that the orifice of the electronic valve 502 respectively increases or decreases in cross-sectional area. By increasing the cross-sectional area of the orifice, the amount of gas being directed into the combustion chamber can be increased. By decreasing the cross-sectional of the orifice, the amount of gas being directed into the combustion chamber can be decreased.

Figure 6:
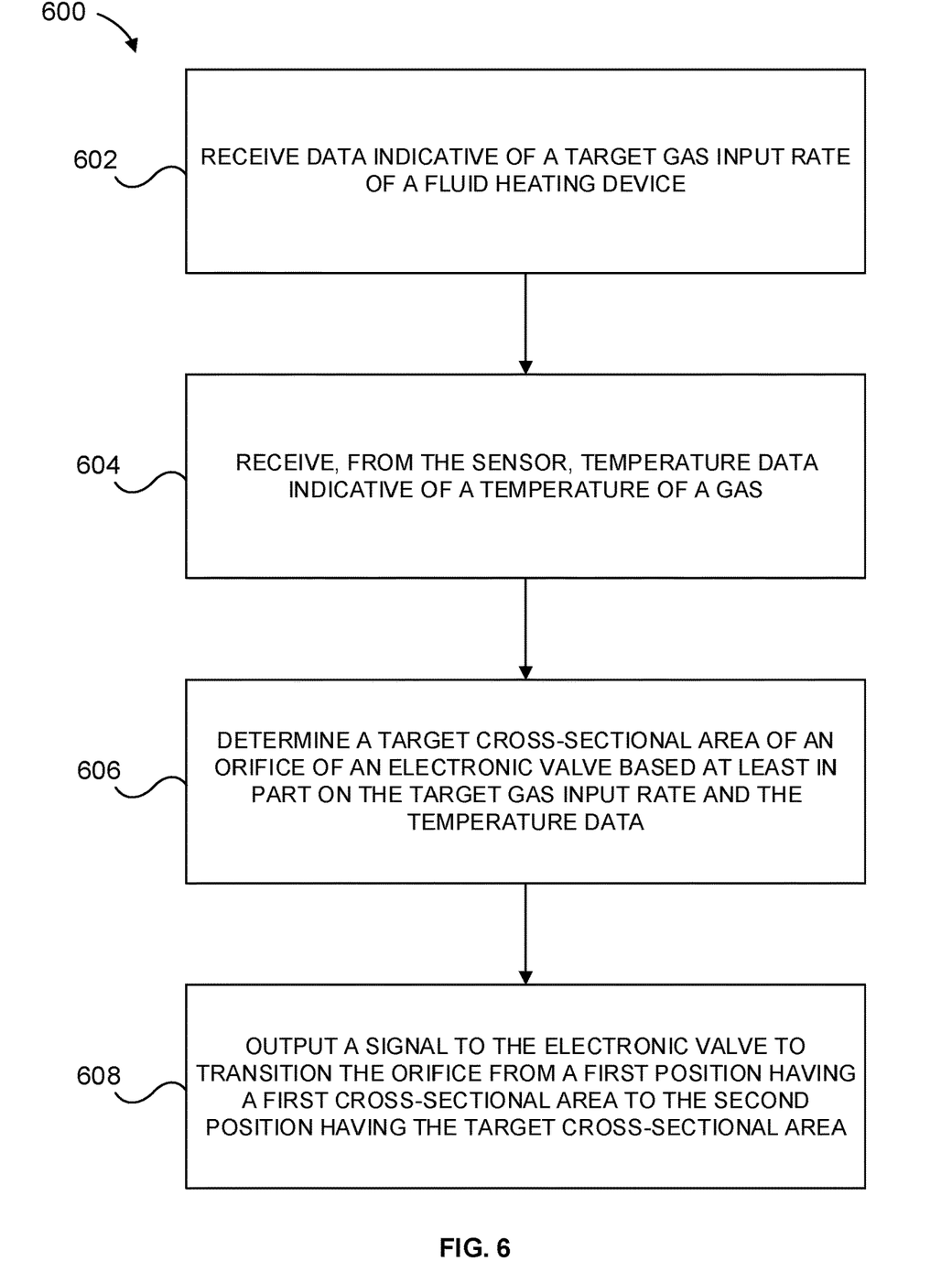
FIG. 6 is a flow diagram outlining a method of controlling a target gas input rate via the gas delivery system of FIG. 5, in accordance with the disclosed technology.

FIG. 6 is a flow diagram outlining a method 600 of controlling a target gas input rate of a fluid heating device. The method 600 can include receiving 602 data indicative of a target gas input rate of the fluid heating device (e.g., BTU input rate). As explained above with reference to FIG. 4, a user can use the user interface 124 of the controller 114 to select and/or manually enter using one or more selectable graphical inputs the target gas input rate of the fluid heating device. Alternatively or in addition, a manufacturer of the fluid heating device can pre-program the target gas input rate of the fluid heating device and/or provide materials that indicate the target gas input rate. Optionally, the user can further select and/or manually enter using one or more selectable graphical inputs the type of the gas that is being delivered into the combustion chamber of the fluid heating device.

The method 600 can include receiving 604, from the sensor 112, temperature data indicative of a temperature of a gas. As explained herein with reference to the gas delivery system 100, the sensor 112 can be configured to record one or more temperatures of the gas within the cavity 104 of the housing 102 on a continuous basis over a predetermined period of time or a periodic basis over a predetermined period of time. Similarly, as explained herein with reference to the gas delivery system 100, the sensor 112 can be configured to transmit to the controller 114 the recorded one or more temperatures of the gas within the cavity 104 of the housing 102 as temperature data either simultaneously as the temperatures are recorded or periodically over a predetermined period of time.

The method 600 can further include determining 606 (e.g., by the controller 114) a target cross-sectional area of the orifice of the electronic valve 502 based at least in part on the temperature data indicative of the temperature of gas and the target gas input rate. Optionally, the controller 114 can determine the target cross-sectional area of the orifice based additionally on the type of the gas being delivered into the combustion chamber.

Determining the target cross-sectional area of the orifice of the electronic valve 502 can include comparing the temperature of the gas being delivered to the combustion chamber to a stored threshold temperature. Optionally, the stored threshold temperature can be based on the type of the gas. If the temperature of gas being delivered to the combustion chamber is greater than the stored threshold temperature, the controller 114 can determine that an increase in the amount of gas is required to maintain the target gas input rate. Accordingly, an increase in the cross-sectional area of the orifice of the electronic valve 502 as compared to the initial cross-sectional area of the orifice can be required to maintain the target gas input rate. Alternatively, if the temperature of gas being delivered to the combustion chamber is less than the stored threshold temperature, the controller 114 can determine a decrease in the amount of gas is required to maintain the target gas input rate. Accordingly, a decrease in the cross-sectional area of the orifice of the electronic valve 502 as compared to the initial cross-sectional area of the orifice can be required to maintain the target gas input rate.

Optionally, the controller 114 can determine the target cross-sectional area using one or more processing and/or algorithmic techniques. Such processing and/or algorithmic techniques can determine the target cross-sectional area based on the temperature of gas being delivered into the combustion chamber, the target heat input, and the type of gas. Optionally, determining the target cross-sectional area can be based at least in part on additional inputs, including the initial cross-sectional area of the orifice of the electronic valve 502, the maximum cross-sectional area of the orifice of the electronic valve 502, and the minimum cross-sectional area of the orifice of the electronic valve 502.

The method 600 can include outputting 608 a signal to the electronic valve 502 to transition from a first position to a second position. In the first position, the orifice of the electronic valve 502 can have a first cross-sectional area and in the second position the orifice can have the target cross-sectional area. Optionally, the first position can be the initial cross-sectional area. The electronic valve 502 can transition from the first position to the second position as discussed herein (e.g., the actuator can mechanically raise and/or lower a stem of the electronic valve 502 or rotate a stem of the electronic valve 502).

Optionally, the controller 114 can continue to receive temperature data from the sensor 112 over predetermined time. Accordingly, if the controller 114 determines a change in the target cross-sectional area is required to maintain the target gas input rate, the controller 114 can output a signal to the electronic valve 502 to transition from the second position having the target cross-sectional area to the third position having a "new" target cross-sectional area. The "new" target cross-sectional area can be greater than or less than the original target cross-sectional area of the second position.

Although determining a target cross-sectional area to maintain the target gas input rate is discussed herein, it is contemplated a target diameter can similarly be determined to maintain the target gas input rate. Accordingly, the method 400 can further include outputting a signal to the modulating orifice 118 to transition from a first position having a first diameter to a second position having a second diameter and the method 600 can further include outputting a signal to the electronic valve 502 to transition from a first position having a first diameter to a second position having a second diameter.

Although the disclosed technology as discussed herein refers to a gas delivery system 100, 500 that directs gas (e.g., natural gas, propane, and the like) toward the burner of a combustion chamber, it is contemplated that the gas delivery system 100, 500 can be similarly used to direct air toward the combustion chamber of the fluid heating device.

Certain examples and implementations of the disclosed technology are described above with reference to block and flow diagrams according to examples of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams do not necessarily need to be performed in the order presented, can be repeated, or do not necessarily need to be performed at all, according to some examples or implementations of the disclosed technology. It is also to be understood that the mention of one or more method steps does not preclude the presence of additional method steps or intervening method steps between those steps expressly identified. Additionally, method steps from one process flow diagram or block diagram can be combined with method steps from another process diagram or block diagram. These combinations and/or modifications are contemplated herein.

What is claimed is:

1. A gas delivery system for controlling a target gas input rate of a fluid heating device comprising:
   a sensor in fluid communication with a fuel gas flowing in a gas flow path, the sensor configured to measure a temperature of the fuel gas;
   a modulating orifice in fluid communication with the gas flow path;
   a motor in mechanical communication with the modulating orifice; and
   a controller in communication with the sensor and the motor, the controller configured to:
      receive, from the sensor, temperature data indicative of the temperature of the fuel gas;
      determine a target cross-sectional area of the modulating orifice based at least in part on the target gas input rate and the temperature data; and
      in response, output a signal to the motor to transition the modulating orifice from a first position having a first cross-sectional area to a second position having the target cross-sectional area.

2. The gas delivery system of claim 1, wherein the controller is further configured to calculate the target gas input rate based at least in part on data indicative of (i) a predetermined temperature of water in a tank of the fluid heating device, (ii) a size of the tank of the fluid heating device, or (iii) a type of the fuel gas flowing in the gas flow path.

3. The gas delivery system of claim 1, wherein:
   the modulating orifice is defined, at least in part, by a plurality of leaves, and
   the motor is configured to alter a configuration of the plurality of leaves to transition the modulating orifice from the first position to the second position.

4. The gas delivery system of claim 1, wherein the controller is further configured to:
   receive data indicative of a type of the fuel gas flowing through the gas flow path; and
   determine the target cross-sectional area of the modulating orifice based at least in part on the type of the fuel gas.

5. The gas delivery system of claim 1, further comprising a housing including an inlet configured to receive the fuel gas flowing in the gas flow path and an outlet, the housing enclosing the sensor and the modulating orifice.

6. The gas delivery system of claim 1, wherein the controller is further configured to:
   determine the temperature of the fuel gas is less than a threshold temperature; and
   determine the target cross-sectional area of the modulating orifice is less than the first cross-sectional area.

7. The gas delivery system of claim 1, wherein the controller is further configured to:
   determine the temperature of the fuel gas is greater than a threshold temperature; and
   determine the target cross-sectional area of the modulating orifice is greater than the first cross-sectional area.

8. The gas delivery system of claim 1, wherein the controller is further configured to:
   determine the temperature of the fuel gas is less than a threshold temperature by a predetermined percentage; and
   determine the target cross-sectional area of the modulating orifice is less than the first cross-sectional area by a predetermined percentage.

9. The gas delivery system of claim 1, wherein the controller is further configured to:
   determine the temperature of the fuel gas is greater than a threshold temperature by a predetermined percentage; and
   determine the target cross-sectional area of the modulating orifice is greater than the first cross-sectional area by a predetermined percentage.

10. The gas delivery system of claim 1, wherein the sensor measures the temperature data over a predetermined period of time and transmits the temperature data a predetermined number of times during the predetermined period of time.

11. The gas delivery system of claim 1, wherein the controller is further configured to:
    receive data indicative of the first cross-sectional area of the modulating orifice; and
    determine the target cross-sectional area of the modulating orifice based at least in part on (i) the first cross-sectional area of the modulating orifice, (ii) a maximum cross-sectional area of the modulating orifice, and (iii) a minimum cross-sectional area of the modulating orifice.

12. The gas delivery system of claim 1, wherein the motor is a stepper motor configured to incrementally increase or decrease the first cross-sectional area of the modulating orifice to transition to the target cross-sectional area.

13. A gas delivery system for controlling a target gas input rate of a fluid heating device comprising:
    a sensor in communication with a fuel gas flowing in a gas flow path, the sensor configured to measure a temperature of the fuel gas;
    an electronic valve in fluid communication with the gas flow path; and
    a controller in communication with the sensor and the electronic valve, the controller configured to:
       receive, from the sensor, temperature data indicative of the temperature of the fuel gas;
       determine a target cross-sectional area of an orifice of the electronic valve based at least in part on the target gas input rate and the temperature data; and
       output a signal to the electronic valve to transition the orifice from a first position having a first cross-sectional area to a second position having the target cross-sectional area.

14. The gas delivery system of claim 13, wherein the controller is further configured to:
    receive data indicative of a type of the fuel gas flowing through the gas flow path; and
    determine the target cross-sectional area of the orifice of the electronic valve based at least in part on the type of the fuel gas.

15. The gas delivery system of claim 13, further comprising a housing including an inlet configured to receive the fuel gas flowing in the gas flow path and an outlet, the housing enclosing the sensor and the electronic valve.

16. The gas delivery system of claim 13, wherein the controller is further configured to:
    determine the temperature of the fuel gas is less than a threshold temperature; and determine the target cross-sectional area of the orifice of the electronic valve is less than the first cross-sectional area.

17. The gas delivery system of claim 13, wherein the controller is further configured to:
   determine the temperature of the fuel gas is greater than a threshold temperature; and
   determine the target cross-sectional area of the orifice of the electronic valve is greater than the first cross-sectional area.

18. A non-transitory, computer-readable medium storing instructions, that when executed by one or more processors, cause a controller of a gas delivery system to:
   receive, from a sensor, temperature data indicative of a temperature of a fuel gas;
   determine a target cross-sectional area of a modulating orifice based at least in part on a target gas input rate and the temperature data; and
   output a signal to a motor to transition the modulating orifice from a first position having a first cross-sectional area to a second position having the target cross-sectional area.

19. The non-transitory, computer-readable medium of claim 18, wherein the instructions, when executed by the one or more processors, further cause the controller to:
   determine the temperature of the fuel gas is less than a threshold temperature; and
   determine the target cross-sectional area of the modulating orifice is less than the first cross-sectional area.

20. The non-transitory, computer-readable medium of claim 18, wherein the instructions, when executed by the one or more processors, further cause the controller to:
   determine the temperature of the fuel gas is greater than a threshold temperature; and
   determine the target cross-sectional area of the modulating orifice is greater than the first cross-sectional area.

* * * * *